United States Patent
Van Den Berg (10) Patent No.: US 8,286,583 B2
(45) Date of Patent: Oct. 16, 2012

(54) METHOD OF CONTROLLING A MILKING IMPLEMENT, A SOFTWARE PROGRAM FOR AND AN IMPLEMENT PERFORMING THE METHOD

(75) Inventor: Karel Van Den Berg, Bleskensgraaf (NL)

(73) Assignee: Maasland N.V., Maassluis (NL)

( * ) Notice: Subject to any disclaimer, the term of this patent is extended or adjusted under 35 U.S.C. 154(b) by 690 days.

(21) Appl. No.: 12/440,020

(22) PCT Filed: Aug. 28, 2007

(86) PCT No.: PCT/NL2007/000209
§ 371 (c)(1),
(2), (4) Date: Mar. 5, 2009

(87) PCT Pub. No.: WO2008/030085
PCT Pub. Date: Mar. 13, 2008

(65) Prior Publication Data
US 2011/0048329 A1    Mar. 3, 2011

(30) Foreign Application Priority Data
Sep. 5, 2006  (NL) ...................................... 1032429

(51) Int. Cl.
*A01J 5/007* (2006.01)
(52) U.S. Cl. .................. 119/14.02; 119/14.1; 119/14.08
(58) Field of Classification Search ............... 119/14.02, 119/14.1, 14.08
See application file for complete search history.

(56) References Cited

U.S. PATENT DOCUMENTS

| | | | |
|---|---|---|---|
| 4,726,322 A | 2/1988 | Torsius | |
| 6,575,116 B1* | 6/2003 | Birk et al. | 119/14.48 |
| 7,568,447 B2* | 8/2009 | Peacock | 119/14.08 |
| 2003/0097990 A1* | 5/2003 | Bjork et al. | 119/14.08 |
| 2003/0145795 A1* | 8/2003 | Nilsson | 119/14.02 |
| 2005/0066904 A1* | 3/2005 | Berg et al. | 119/14.08 |

FOREIGN PATENT DOCUMENTS

| | | |
|---|---|---|
| WO | 98/11773 A | 3/1998 |
| WO | 00/13490 A | 3/2000 |
| WO | 2007/050012 A | 5/2007 |
| WO | 2007/104124 A | 9/2007 |

* cited by examiner

Primary Examiner — Rob Swiatek
Assistant Examiner — Lisa Tsang
(74) Attorney, Agent, or Firm — Coraline J. Haitjema; David P. Owen; Hoyng Monegier LLP (57) ABSTRACT

A method of controlling a milking implement for automatically milking a dairy animal with an udder, such as a cow, which milking implement includes a camera and a teat cup. More particularly, the method includes attaching the teat cup to a teat of the udder, followed by producing by the camera an image of at least a part of the udder and of at least a part of the teat cup, making an analysis of the image of the udder with the teat cup, and performing at least one control action by the milking implement, based on the analysis.

22 Claims, 10 Drawing Sheets

METHOD OF CONTROLLING A MILKING IMPLEMENT, A SOFTWARE PROGRAM FOR AND AN IMPLEMENT PERFORMING THE METHOD

This application is a continuation of international application no. PCT/NL2007/000209, filed on Aug. 28, 2007, and claims priority from Netherlands application no. 1032429 filed on Sep. 5, 2006. The contents of both applications are hereby incorporated by reference in their entirety.

BACKGROUND OF THE INVENTION

1. Field of the Invention

The present invention relates to a method of controlling an implement for automatically milking a dairy animal, such a cow.

2. Description of the Related Art

International patent application WO 01/03497 A1 discloses a method wherein a teat cup is monitored by means of a mass inertia sensor. The relevant teat cup forms part of an implement for automatically milking a cow, which is further provided with a robot arm. The teat cup comprises a casing and a liner, so that areas are created that are separated from each other. These areas are each in communication with a line, in order to apply a milking vacuum in the area inside the liner and to apply a pulsating, or pulsation vacuum in the area between the liner and the casing. Thanks to the pulsation vacuum there is alternately achieved a suction phase and a release phase.

The robot arm has a holder in which the teat cup is detachably received and which remains in connection with the teat cup by means of an adjustable cord. The robot arm moves the teat cup to a teat, after which a vacuum is applied to the teat cup, as a result of which the teat cup is attached to the teat. Subsequently, the robot arm is moved away. If it appears from a signal from the mass inertia sensor that the teat cup falls from the teat, the vacuum is removed. Moreover, the cord is tightened in order to move the teat cup to the holder in the robot arm. Subsequently, the teat cup is attached again to the teat with the aid of the robot arm.

A disadvantage of the known method is that it is expensive and insufficiently reliable.

BRIEF SUMMARY OF THE INVENTION

The invention aims at obviating the above-mentioned drawbacks at least partially, or at providing at least an alternative.

This object is achieved by the invention with a method of controlling a milking implement for automatically milking a dairy animal with an udder, such as a cow. The milking implement comprises a camera and a teat cup. The method includes the following steps: attaching the teat cup to a teat of the udder, followed by producing by means of the camera an image of at least a part of the udder and of at least a part of the teat cup, making an analysis of the image of the udder with the teat cup, and performing at least one control action by means of the milking implement, based on the analysis.

By using a camera to feed the analysis, it is not necessary to use a mass inertia sensor such as in the state of the art. A camera is in general more reliable than a mass inertia sensor and, moreover, its operation can be tested more simply. If a mass inertia sensor does not operate correctly, this will usually only be found in the case of a proper test, or if in a practical situation the teat cup falls without a control of the milking implement intervening. This may lead to contamination of the teat cup, of the already obtained milk and to damage of the relevant teat cup. Furthermore, the inventive solution can be achieved in a cheap manner, in particular in those cases in which a camera is already provided for controlling the attachment of the teat cup to the teat.

In one embodiment, the step of making the analysis comprises analysing a manner in which the teat is received in the teat cup. From the manner in which the teat is received in the teat cup it can be deduced whether a proper connection has been achieved and in which stage the milking process is.

In particular, the distance from an upper edge of the teat cup to the udder is determined, which distance is compared with a predetermined value. If the distance from the upper edge of the teat cup to the udder exceeds a particular value, this is an indication that the milking vacuum is too low, or that the pulling force on the teat cup is too high.

In a variant, an analysis is made of a part of the teat, which part is located between the teat cup and the udder. If this part deviates from a predetermined shape, this may be a signal that the teat has tipped over and has, therefore, not been received correctly in the teat cup.

In one embodiment, an analysis is made of a position of an end of the teat relative to the teat cup. By comparing the position with a stored position, for example a position during a previous milking process, or a position at the beginning of the current milking process, information can be deduced regarding the progress of the current milking process.

In a favorable embodiment, the camera repeatedly produces images of the udder with the teat cup and an analysis is made of differences between the repeatedly produced images of the udder with the teat cup. This generates information regarding the development of the milking process over time.

In particular, an analysis is made of a duration and/or a size of a milk flow from the teat. By analyzing the milk flow it can be deduced in which stage the current milking process is.

More in particular, an analysis is made of an alteration of a shape of a liner of the teat cup. From the alteration of the shape information can be deduced regarding the quality of the milking and pulsation vacuum.

A favorable method further comprises a step of producing by means of the camera a start image of at least the teat, which step precedes the step of attaching the teat cup to the teat. From such a start image it is possible to deduce information regarding the damming up in the udder, which may be used for pre-adjusting the pulsation vacuum and the expected duration of the milking. The start image may further be used as a reference for later images in order to determine the progress of the milking.

In particular, an analysis is made of a milk pressure in the teat on the basis of a comparison of the start image of the teat with a recorded image of the teat.

In a variant, an analysis is made of an orientation of the teat relative to the udder shown in the start image. On the basis thereof it is possible to determine an optimum orientation of the teat cup relative to the udder.

In one embodiment, an analysis is made of an orientation of the teat cup relative to the udder shown in the image of the udder with the teat cup. It is possible to deduce therefrom to what extent the current position of the relevant teat cup relative to the udder is a proper one.

In a favorable embodiment, the at least one control action comprises the detachment of the teat cup. This action is chosen, for example, if it appears from the analysis that the teat cup has not been attached properly, or that the milking process has come to an end.

In particular, the detachment of the teat cup is followed by the renewed attachment of the teat cup to the same teat of the udder. This step is chosen if it appears from the analysis that the teat cup had not been attached properly.

In one embodiment, the at least one control action comprises the adjustment of a vacuum in the teat cup. This may be the milking vacuum, the pulsation vacuum, or both of them. The milking intensity is thus adjusted to the current situation.

In particular, the adjustment of the vacuum in the teat cup comprises the adjustment of a magnitude of a milking vacuum that is exerted on an end of the teat in order to suck milk. By making the milking vacuum less deep, the teat cup will shift on the teat towards the udder to a lesser extent.

More in particular, the adjustment of the vacuum in the teat cup comprises the adjustment of a pulsation vacuum that is exerted on a liner in the teat cup. Such an adjustment may be both the depth of the pulsation vacuum during the suction phase and the duration of the release phase.

In one embodiment, the at least one control action comprises the adjustment of a pulling force on the teat cup. Such a pulling force is exerted, for example, on the lower side of the teat cup by means of a cord. If it appears from the analysis that the teat cup shifts too far towards the udder, the pulling force can be increased. In the inverse situation, the pulling force can be decreased.

In a favorable embodiment, the at least one control action comprises the displacement of a milking robot arm. By displacing the milking robot arm, the orientation of the teat cup relative to the udder can be improved.

The invention further relates to a software program comprising program instructions for performing the method according to the invention, when the software program is loaded in a control system for a milking implement for automatically milking a dairy animal.

The invention also relates to a milking implement for automatically milking a dairy animal, such as a cow, which milking implement comprises a camera, a teat cup and a control system. The control system is designed to perform the method according to the invention. This may be achieved, for example, by loading a software program according to the invention into a memory of the control system. It is also possible to provide the control system with hardware components that mutually cooperate in such a way that a method according to the invention is performed.

In particular, the camera is designed to produce a spatial image. The relevant spatial information may be used in the analysis on which a control action is based. A spatial image has the advantage that not only the shape in view, but also the shape in three dimensions and, if desired, the content can be determined of, for example, the teat, the udder, the milk flow, or the liner.

More in particular, the camera comprises: a radiation source for emitting electromagnetic radiation, in particular light, a matrix with a plurality of rows and a plurality of columns of receivers for receiving electromagnetic radiation reflected from the dairy animal, and sensor control means, wherein the sensor control means are operatively connected to the radiation source in order to modulate the electromagnetic radiation, and the sensor control means are designed to determine for each of the receivers a phase difference between the emitted and the reflected electromagnetic radiation.

Such a camera gives a reliable spatial image, in the form of distance or depth information, from a plurality of points on an object to be observed to the camera. This may thus also be called a depth image. Such a camera is relatively cheap and generates the spatial image in a short time.

The following is an explanation of the operation of an embodiment of such a camera. The radiation source emits electromagnetic radiation. Preferably light is used for this purpose, more preferably infrared radiation, more preferably near infrared (NIR) radiation. For this purpose, in particular suitable LED's may be used, which can be controlled in a very simple manner by means of an electrically controllable supply current, and which are moreover very compact and efficient and have a long life. Nevertheless, other radiation sources might be used as well. (Near) infrared radiation has the advantage of not being annoying for the dairy animals.

The radiation is modulated, for example amplitude modulated, according to a modulation frequency which, of course, differs from, and is much lower than, the frequency of the electromagnetic radiation itself. The, for example, infrared light is here a carrier for the modulation signal.

With the aid of the emitted radiation the distance is determined by measuring a phase shift of the modulation signal, by comparing the phase of reflected radiation with the phase of reference radiation. For the latter the emitted radiation is preferably transferred (almost) immediately to the receiver. The distance can be determined in a simple manner from the measured phase difference by:

$$\text{distance} = \tfrac{1}{2} \times \text{wave length} \times (\text{phase difference}/2\pi),$$

in which the wave length is that of the modulation signal. It should be noted that in the above-mentioned equation ambiguity of the distance determination is not yet taken into account, which ambiguity occurs in that a phase difference owing to periodicity can belong to a distance A, but also to A+n×(wave length/2). For that reason it may be useful to choose the wave length of the amplitude modulation in such a way that the distances occurring in practice will indeed be determined unambiguously.

Preferably, a wave length of the modulation, for example amplitude modulation, of the emitted radiation is between 1 mm and 5 meters. With such a wave length it is possible to determine unambiguously distances up to a maximum distance of 0.5 mm to 2.5 meters. Associated therewith is a modulation frequency of 300 MHz to 60 kHz which can be achieved in a simple manner in electric circuits for actuating LED's. It is pointed out that, if desired, it is also possible to choose even smaller or greater wave lengths.

In a favorable variant, the teat cup comprises a casing and a liner, which casing is at least partially manufactured from a material that is transmissive of light with a wave length that is observable by the camera. This makes it possible for a camera arranged outside the teat cup to produce an image of the liner.

In one embodiment, the teat cup comprises a casing and a liner, which liner is at least partially manufactured from a material that is transmissive of light with a wave length that is observable by the camera. It is thus possible for a camera arranged outside the liner to produce an image of the teat received in the liner.

BRIEF DESCRIPTION OF THE DRAWINGS

The invention will now be explained in further detail with reference to exemplary embodiments shown in the accompanying figures, in which.

DESCRIPTION OF ILLUSTRATIVE EMBODIMENTS

The following is a description of certain embodiments of the invention, given by way of example only and with reference to the drawings. The implement for automatically milking an animal, such as a cow, shown in a diagrammatic perspective view in FIG. 1, comprises a milking parlour 1 that accommodates one single animal, such as a cow. This milking parlour 1 is surrounded in a customary manner by a fencing 2 and is provided with an entrance door and an exit door which are, incidentally, not shown in the figures. In the milking parlour 1 and in the immediate vicinity thereof there is a milking robot comprising a robot arm construction 3 for automatically attaching a teat cup to a teat of an animal to be milked. The robot arm construction is provided with a robot arm 4 for carrying a teat cup, which robot arm 4 is pivotable to under the udder of the animal (see FIG. 3).

The robot arm construction 3 is provided with a first robot arm construction portion 5 and a second robot arm construction portion 6. The first robot arm construction portion 5 is pivotably connected to an upper side of the fencing 2 by means of a first horizontal axle 7. The second robot arm construction portion 6 is pivotably connected to the first robot arm construction portion 5 by means of a second horizontal axle 8 that is located outside the milking parlour 1. The robot arm 4 is connected to the second robot arm construction portion 6. The robot arm 4 may be rigidly connected to the second robot arm construction portion 6, or may be connected thereto via a third horizontal and/or a vertical axle, so that the robot arm is pivotable relative to the second robot arm construction portion, for example with the aid of a control cylinder.

A first control cylinder 9 has a first point of application 10 on the second robot arm construction portion 6 and a second point of application 11 on the fencing 2 at a place at a first distance below the first horizontal axle 7. A second control cylinder 12 has a first point of application 13 on the first robot arm construction portion 5 and a second point of application 14 on the fencing 2 at a place at a second distance below the first horizontal axle 7, the second distance being greater than the first distance. The second control cylinder 12 may be a single control cylinder or may be formed by two control cylinders that are placed on either side of the first control cylinder 9, as is clearly visible in FIG. 1. Here, the first point of application 10 is located on the second robot arm construction portion 6 at least approximately halfway the second robot arm construction portion 6. In order to obtain a virtually horizontal movement of the free end of the robot arm 4, the first point of application 10 on the second robot arm construction portion 6 is located at the side of the second robot arm construction portion 6 opposite the fencing 2. The first point of application 13 on the first robot arm construction portion 5 is located closer to the second horizontal axle 8 than to the first horizontal axle 7. In order to obtain a relatively compact construction, the first point of application 10 on the first robot arm construction portion 5 is orientated towards the robot arm 4.

The robot arm construction 3 is displaceable in the longitudinal direction of the milking parlour 1 by means of a support unit 15 which is displaceable along rails 16 and 17. The rail 16 is placed at the upper side of the fencing 2 and the rail 17 is disposed, in both embodiments, approximately at half the height of the milking parlour 1 at the longitudinal side of the fencing 2 and namely at that side where the robot arm construction 3 is located. Both at its upper side and its lower side the support unit 15 is provided with rollers 18, 19 and 20. It is possible for the support unit 15 to be displaced along the rails 16, 17 by means of a control cylinder (not shown) whose point of application on the support unit 15 is denoted by reference numeral 21. The first horizontal axle 7 and the second horizontal axle 8 are disposed on the support unit 15, and the second point of application 11 of the first control cylinder 9 and the second point of application 14 of the second control cylinder 12 act on the support unit 15.

Figure 3:
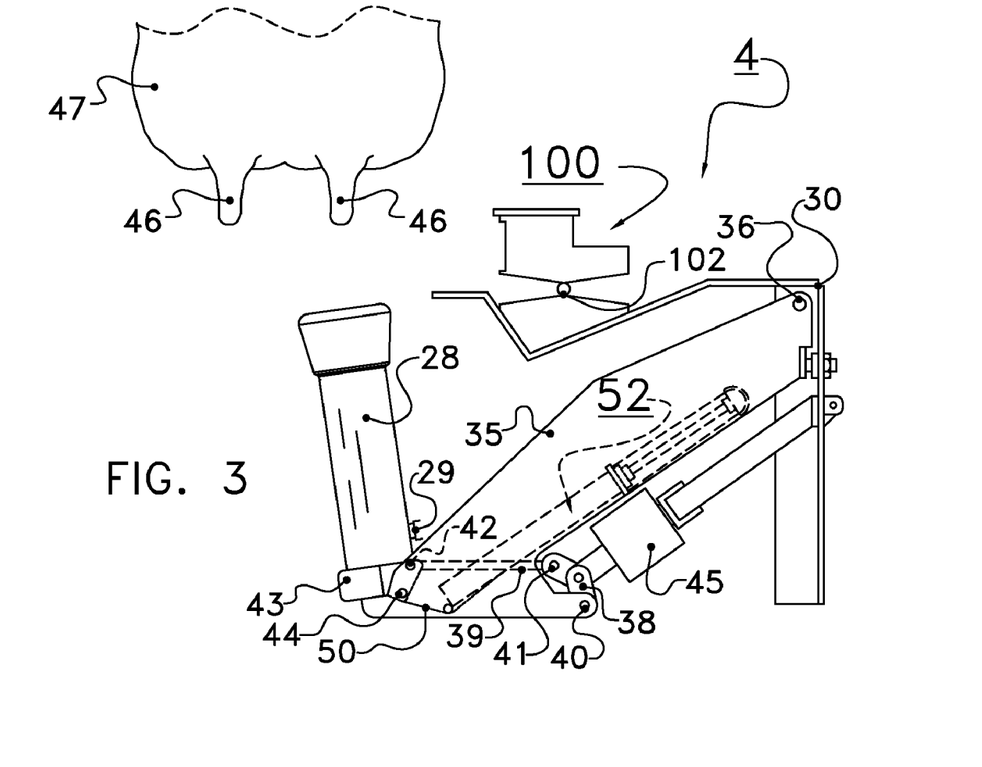
FIG. 3 is a side view of an end of a robot arm construction with the camera being fastened in an alternative manner.

FIG. 3 shows in detail the free end of a robot arm, for example the robot arm 4. On the free end of the robot arm 4 there are provided four teat cups 28, one of which is visible in the shown view. The teat cups 28 are each connected to a hose 29 for discharging milk from the teat cup 28 and a hose 67 (shown in FIGS. 6-9) for applying a pulsation vacuum.

The free end of the robot arm 4 comprises a support element 30. For each teat cup 28 there is provided a housing 35 which is connected to the support element 30 by means of a hinge pin 36. Each housing 35 is provided with a coupling mechanism 37 which comprises a bent lever 38 and a control lever 39. At one end, the bent lever 38 is connected to the housing 35 by means of a hinge pin 40. At the other end, the bent lever 38 is connected to the control lever 39 by means of a hinge pin 41. At its other side, the control lever 39 is connected to a holder 43 for the teat cup 28 by means of a hinge pin 42. The holder 43 is further connected to the housing 35 by means of a hinge pin 44. In the housing 35 there is further provided a control cylinder 45 which is connected to a support element 30 and at the other side to the bent lever 38.

In the situation of FIG. 3 the control cylinder 45 is retracted, as a result of which the housing 35 is in a low position and the holder 43 with the teat cup 28 is tilted. By extending the control cylinder 45, the holder 43 and the teat cup 28 tilt towards a vertical orientation (not shown). Further operation of the control cylinder 45 results in that the housing 35 moves upward in order to attach the teat cup 28 to a teat 46 of an udder 47.

After the teat cup 28 has been attached to the teat 46, the housing 35 is moved downward. The teat cup 28 then remains connected to the housing 35 by means of a cord 50. The cord 50 extends from the lower side of the teat cup 28, through the holder 43 and below a roller 51, to a control cylinder 52. During the downward movement of the housing 35 the control cylinder 52 is retracted in order to release the cord 50. By extending again the control cylinder 52 the cord 50 pulls the teat cup 28 back to the holder 43. For a more detailed description of the robot arm construction 3 reference is made to European patent application EP1442657A1. For a more detailed description of the operation of the teat cups 28 reference is made to EP0862360A1.

On the robot arm construction 3 there is provided a camera, in this case a combined 2D/3D camera 100. The 2D/3D camera 100 comprises a housing 101 of synthetic material which, in the embodiment of FIG. 3, is movably connected to the support element 30 via a ball joint 102. The 2D/3D camera 100 is capable of rotating about a vertical axis by means of the ball joint 102 and of tilting about a horizontal axis by means of the ball joint 102 with the aid of not shown actuators, for example servo motors.

Figure 4:
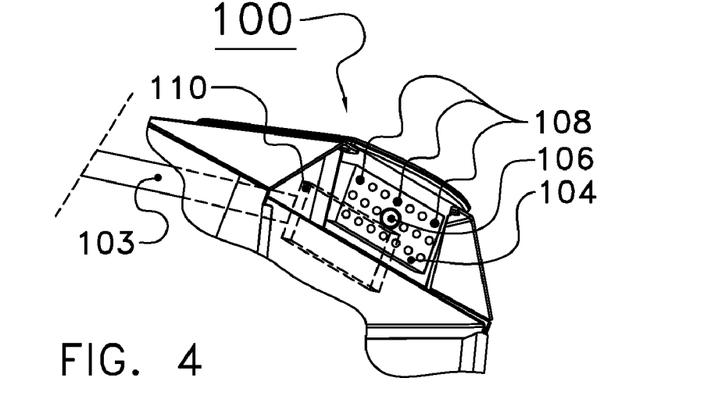
FIG. 4 is a spatial view of a camera.

Alternatively, the 2D/3D camera 100 may be rigidly connected to the robot arm 4 (embodiment FIGS. 1 and 2), or be individually movably connected, via an arm 103, to another part of the milking implement, for example to the fencing 2 (partially shown in the embodiment of FIG. 4).

The housing 101 comprises a front side 104. In the front side 104 there are included a lens 106 and a plurality of radiation sources, in this embodiment light sources 108 in the form of infrared light emitting diodes (IR LED's). In a variant, the lens 106 is provided at the inner side of the front side 104, the front side 104 being manufactured from a material that is transmissive of infrared light. The lens 106 is thus protected against external influences, while the flat front side 104 of synthetic material can more easily be cleaned than the front side 104 with the projecting lens 106.

In the housing 101 there is further included a place-sensitive sensor, such as a CMOS image sensor 110. The CMOS image sensor 110 comprises, on a side facing the lens 106, a matrix with a plurality of rows and columns of receivers, in the form of light-sensitive photo diodes. In this embodiment, this is a matrix of 64×64 photo diodes, but resolutions of 176×144, 640×480, and other, smaller or higher, matrix sizes are possible as well. The CMOS image sensor 110 comprises integrated sensor control means which control the IR-LED's 108 and which convert the infrared light incident on each of the photo diodes into a digital signal and transfer this via a not shown wireless connection, or wire connection to a central processing unit, or a computer (see also hereinafter).

The sensor control means of the 2D/3D camera 100 determine the distance from an object to each of the photo diodes by measuring a phase difference between the light that is emitted by the IR-LED's 108 of the 2D/3D camera 100 to an object and the light that returns after reflection to the 2D/3D camera 100, i.e. to the CMOS image sensor 110 thereof.

In a favorable embodiment, the IR-LED's 108 emit an amplitude-modulated waveformed light signal. The amplitude modulation has itself a repetition frequency. After reflection this light signal is imaged by the lens 106 on the CMOS image sensor 110. By determining the phase difference of the received modulated light signal relative to the emitted modulated light signal it is possible to calculate, by means of the wave length of the modulated signal, the distance between the sensor and the object. This occurs in parallel for each of the photo diodes on the CMOS image sensor 110. There is thus created a spatial image of the observed object.

It is pointed out that in this manner the distance has not yet been determined unambiguously. For, it is possible for an object to be located at a plurality of wave lengths of the used light signal of the sensor. This can be solved in practice, for example, by also varying the frequency of the amplitude modulation.

In a particular embodiment, short light pulses may be emitted by the IR-LED's 108, provided that at least one whole wave, preferably two or a plurality of waves, of the modulated signal is/are incident in each light pulse.

Depending on the chosen frequency of the amplitude modulation, it is possible for the 2D/3D camera 100 to make a plurality of images, for example fifty, per second. In this case, each image should be considered as a reliable reproduction of the object observed, such as a teat cup, a teat, or other part of the cow, any movement of the cow leading to much less distortion of the image than in the case of a scanning sensor. Moreover, it is not necessary to move the 2D/3D camera 100 itself for taking a complete shot.

The CMOS image sensor 110 is capable of generating, besides a spatial image, also a two-dimensional image, in which color and extent of reflection of the object observed are transferred as a color image, or are converted into an image in grey tones.

Figure 5:
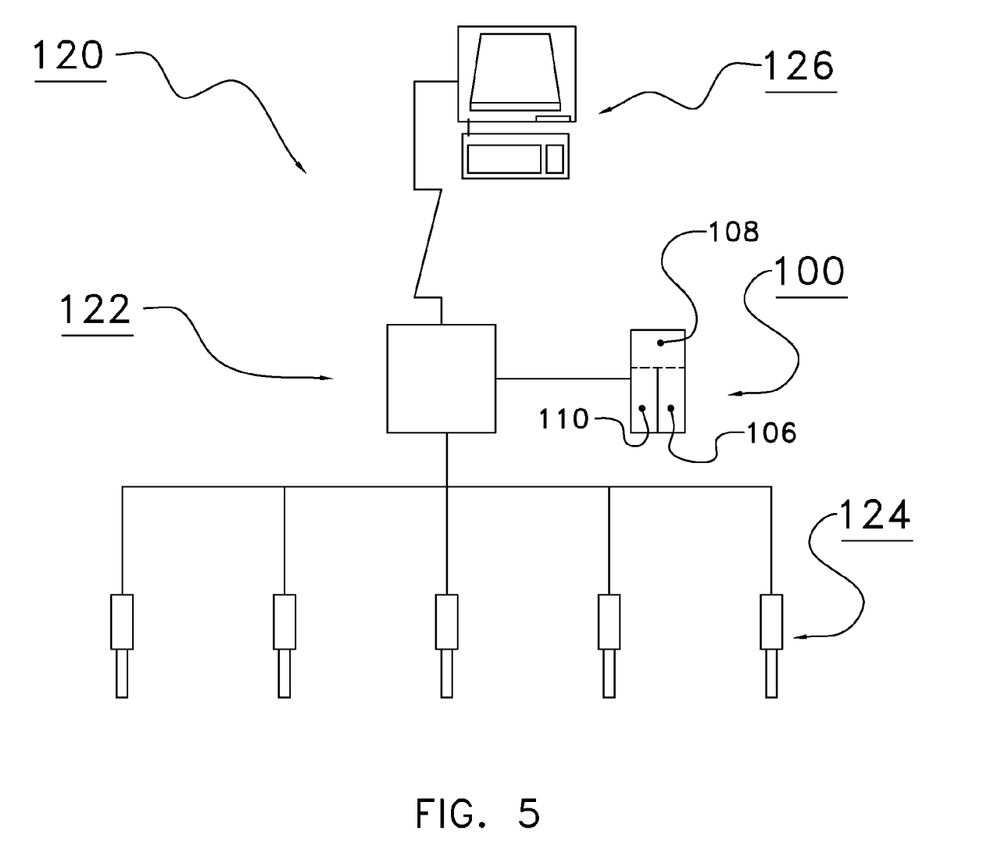
FIG. 5 is a diagrammatic view of a control system of the implement according to the invention.

FIG. 5 shows schematically a robot control, or robot control means, here in the form of a control system 120 of a milking robot, for example the robot arm construction 3. The control system 120 comprises a central processing unit 122 for controlling one or a plurality of actuators 124, and a user's station in the form of a personal computer (PC) 126. The actuators 124 may be the control cylinders 9, 12, 45 and 52 for the robot arm construction 3, as described in relation to FIGS. 1-3, and, possibly, the not shown servo motors for focusing the 2D/3D camera 100 itself.

The central processing unit 122 has a working memory and is programmed with control software and interprets, on the basis of algorithms, or fuzzy logic control, the spatial images and/or the two-dimensional images from the 2D/3D camera 100. On the basis of this interpretation, the central processing unit 122 controls one or a plurality of actuators 124, or for example a vacuum pump (not shown in FIG. 5), as will be described hereinafter in further detail.

The central processing unit 122 is connected to the PC 126 via a fixed, or wireless, connection. Via the PC 126, it is possible for the control software of the central processing unit 122 to be loaded and/or to be adjusted. Furthermore, it is possible for a monitor of the PC 126 to display a whether or not processed image from the 2D/3D camera 100. It is also possible for this screen to display warnings, if any, if the central processing unit 122 establishes, on the basis of the image from the 2D/3D camera 100, that a disturbance, or other undesired event, takes place. Finally, it is possible for the PC 126 to be provided with, or to be connected to a storage medium (not shown) in which images from the camera and/or processed information can be stored.

The teat cup 28 may be designed in different manners, as shown in detail in FIGS. 6-9. Although these embodiments differ from each other, as will be apparent from what follows, identical or comparable components are, for the sake of clarity, always denoted by the same reference numerals The teat cup 28 comprises an outer casing 64 and a flexible liner 65. Between the outer casing 64 and the liner 65 there is a pulsation chamber 65 in which a vacuum (for the suction phase) and an atmospheric pressure (for a release phase) are alternately applied. A pulse hose 67 is connected to the pulsation chamber 66. Near the lower side of the teat cup 28 there is further connected the milk hose 29 to the teat cup 28. Near its lower side, the teat cup 28 has a tapering part 70, while the holder 43 has a tapering recess 71. When the teat cup 28 is drawn onto the holder 43 by means of the cord 50, the teat cup 28 is brought into a predetermined position by means of the tapering parts 70 and 71.

Figure 6:
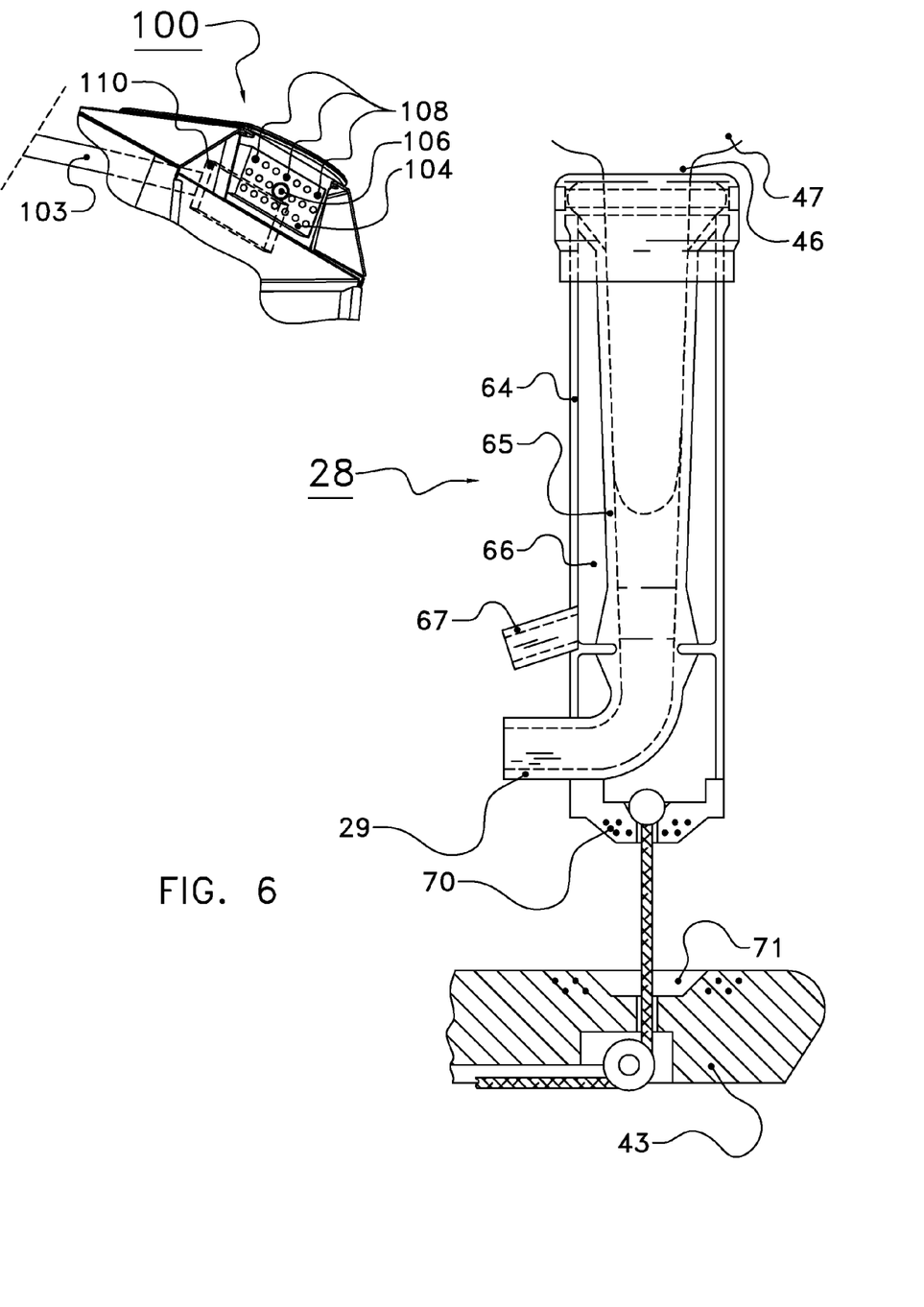
FIG. 6 is a spatial view of a camera with a first embodiment of a teat cup, with a part of a holder for the teat cup in a sectional view.

In the embodiment according to FIG. 6, the casing 64 is transparent, i.e. transmissive of the light emitted by the IR-LED's 108. When applying infrared light, like in this case, or ultraviolet light, it is possible to choose a material that is indeed transmissive of the light concerned, but that is not transmissive of visible light. Of course, at other frequencies of light to be emitted, other materials may be chosen. Such a transparent casing has the advantage that the camera that is arranged outside the casing is nevertheless able to observe the liner 65.

Figure 7:
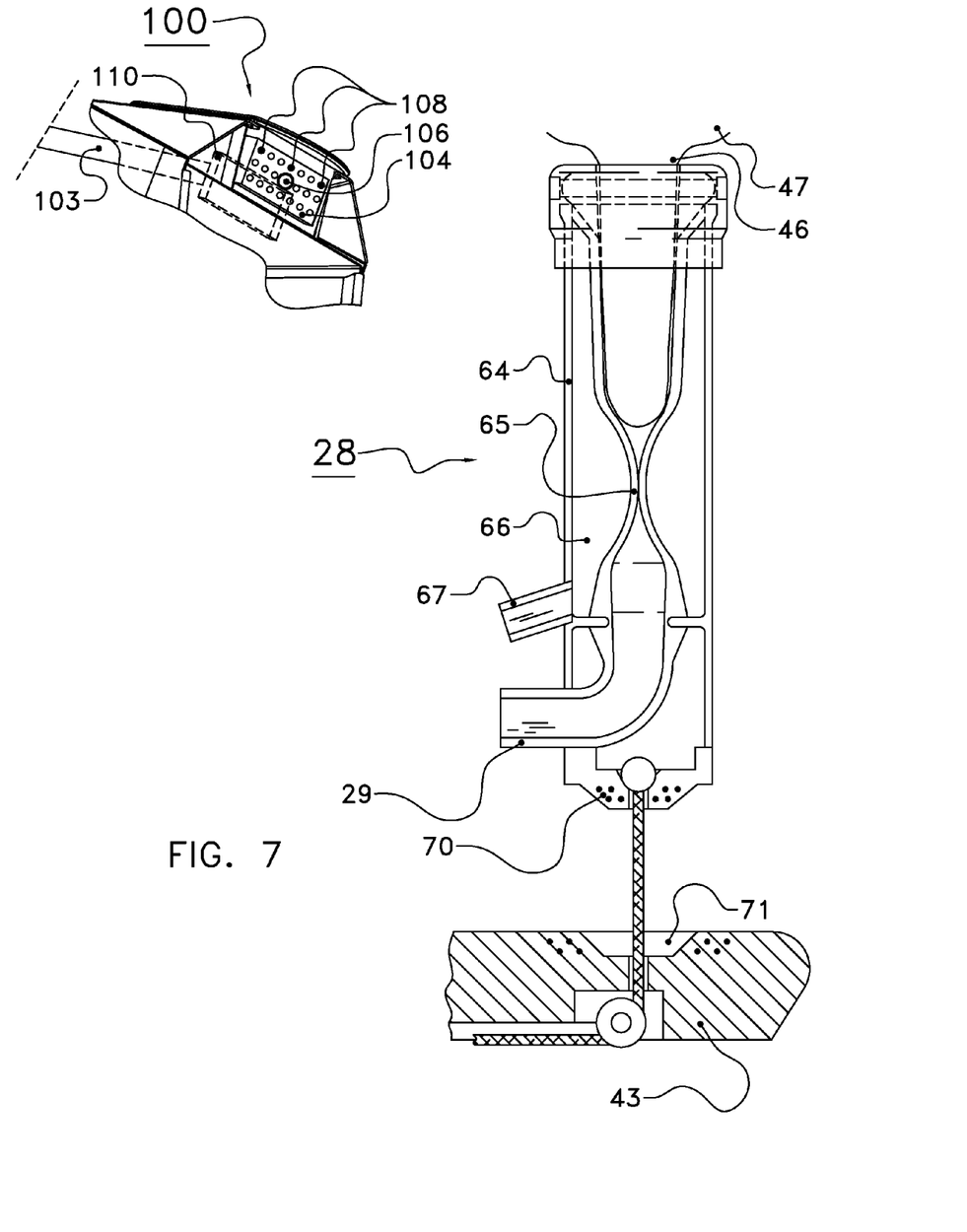
FIG. 7 is a spatial view of a camera with a second embodiment of a teat cup during a release phase, with a part of a holder for the teat cup in a sectional view.
Figure 8:
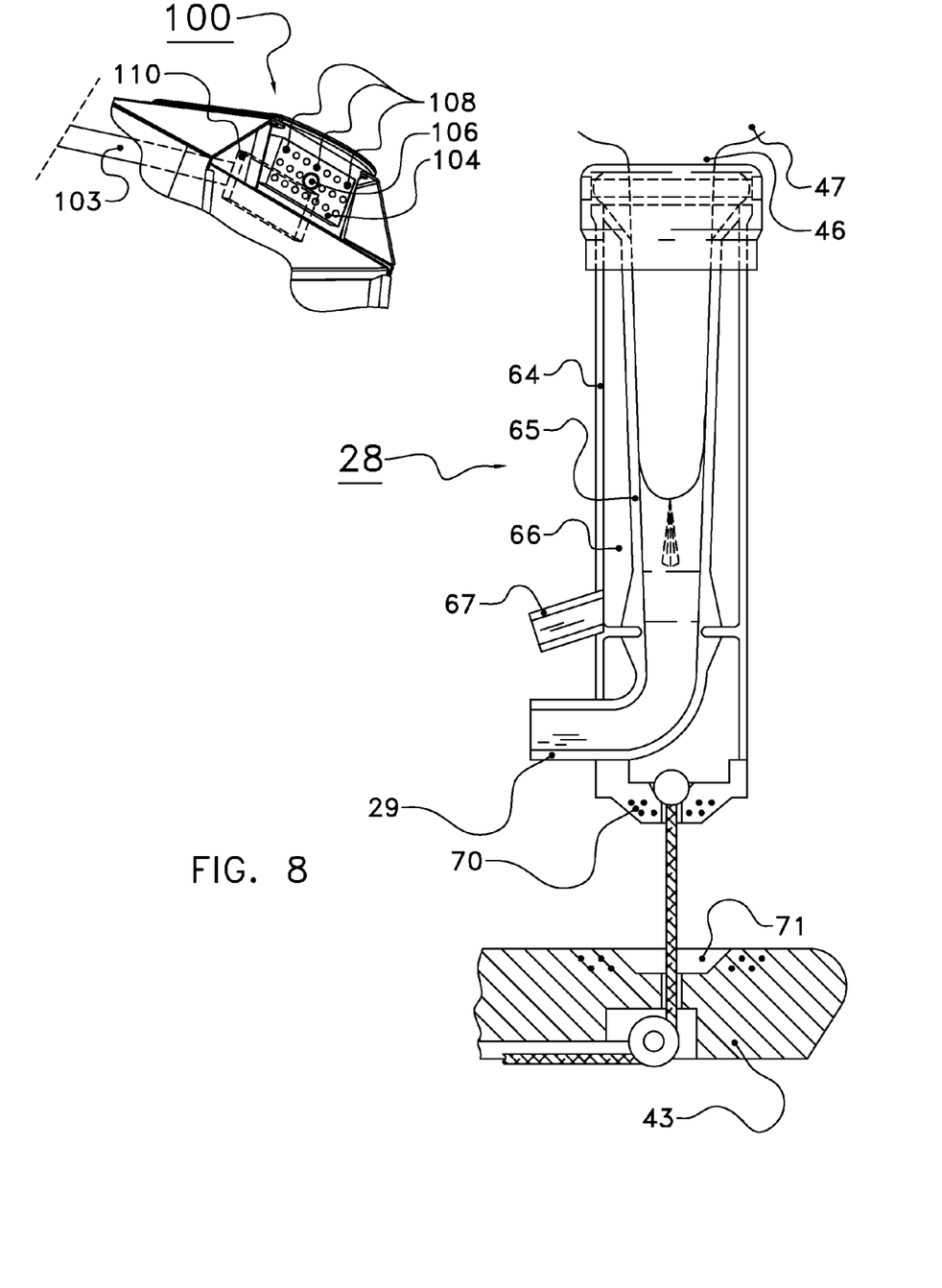
FIG. 8 is the view of FIG. 7 during a suction phase.

In the embodiment according to FIGS. 7 and 8, both the casing 64 and the liner 86 are transparent, i.e. are transmissive of the light emitted by the IR-LED's 108. It is thus possible to obtain, by means of the camera 100 arranged outside the casing, an image both of the teat 46 while the latter is located in the teat cup 28 and of milk that may leave the teat 46 (see FIG. 8).

Figure 9:
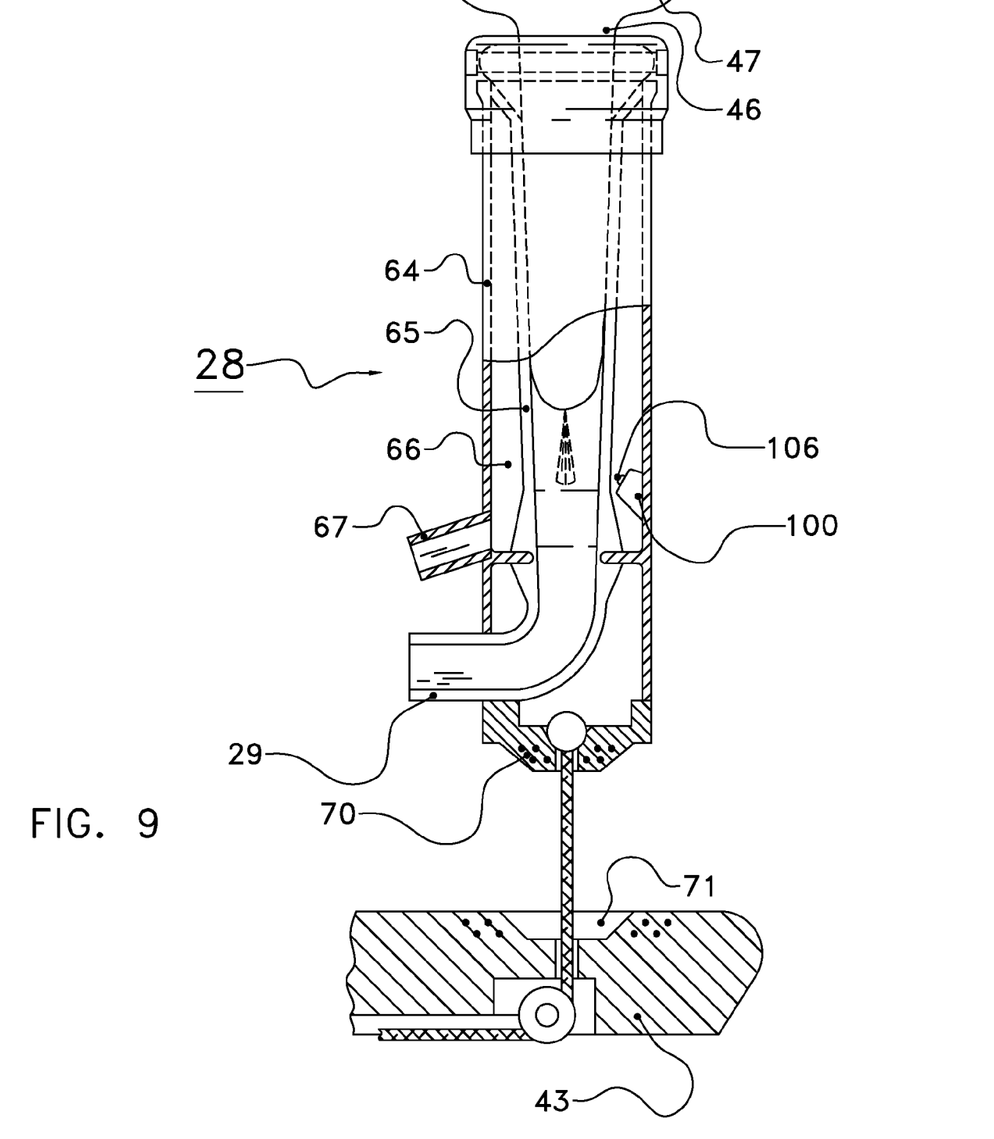
FIG. 9 is a spatial view of a camera with a third embodiment of a teat cup, with a part of a holder for the teat cup in a sectional view.

In the embodiment according to FIG. 9, the casing 64 is non-transparent, whereas the liner 65 is transparent. In a not shown variant, the liner 65 could incidentally be non-transparent as well. In this embodiment, the camera 100 is included in the teat cup 28, in the space between the casing 64 and the liner 65. Here, said camera 100 is comparable with the already described camera 100, but may also be a simpler camera producing, for example, only a two-dimensional image in grey tones and/or color. A lens 106 of the camera 100 is preferably a wide-angle lens, with a relatively small focus distance. Here, the camera 100 is arranged in such a way that it is capable of producing, by means of the wide-angle lens 106, an image of at least a part of the liner 65 and (in this embodiment) of the teat 46 being in the liner 65. This position of the camera 100 has the advantage that it is possible to produce a more accurate image of the liner 65 and the teat 46 than by means of a camera that is arranged outside the teat cup 28. A disadvantage is that the camera 100 arranged in the teat cup can combine fewer functions than a camera arranged outside the teat cup, like in the other embodiments.

Figure 1:
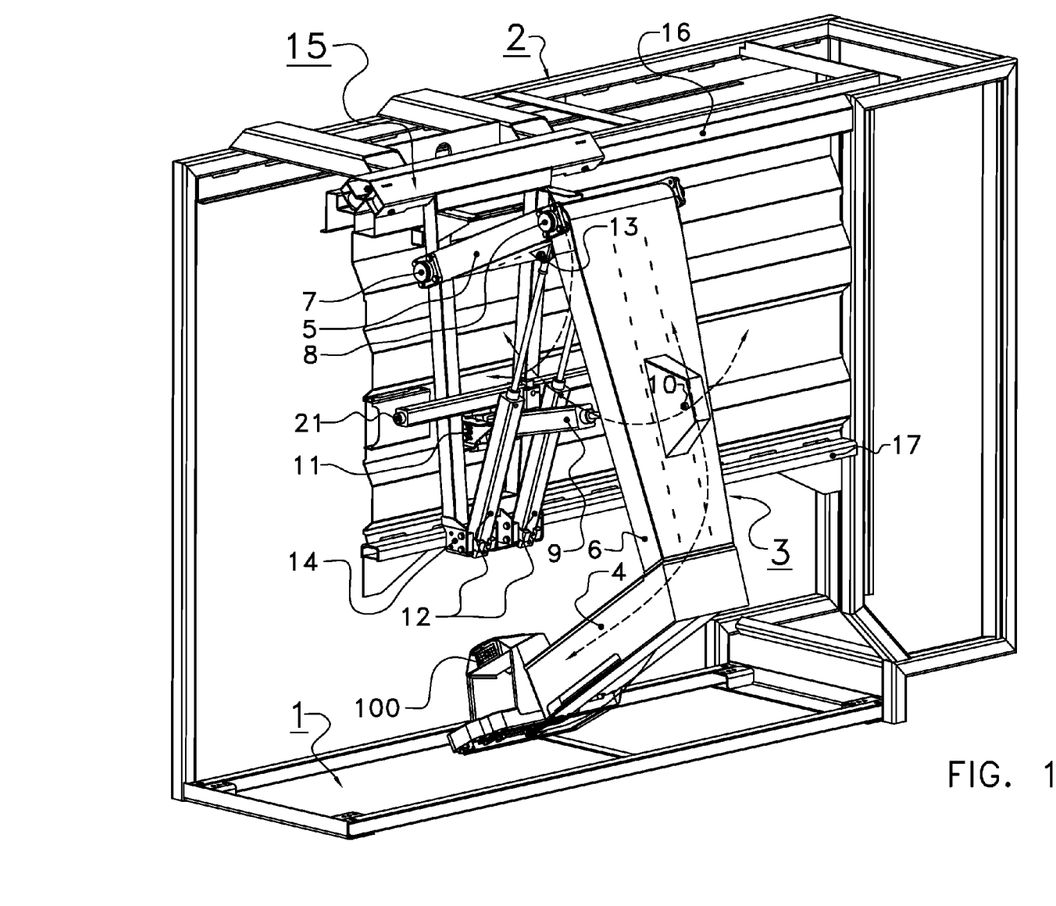
FIG. 1 is a diagrammatic perspective view of an implement with a robot arm construction and a camera according to the invention.
Figure 2:
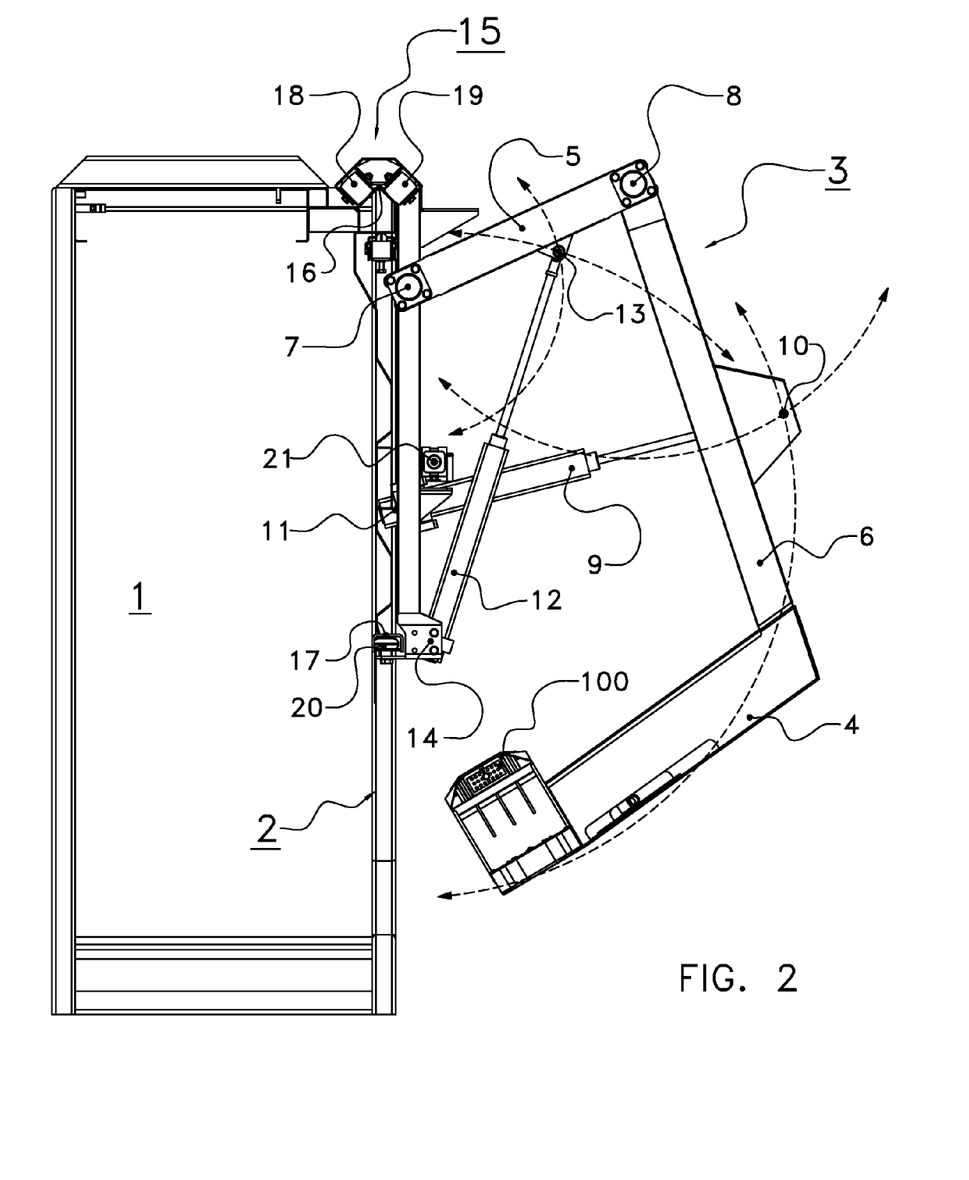
FIG. 2 is a front view of the implement shown in FIG. 1.

During operation, a cow is in the milking parlour 1 (FIGS. 1 and 2). The 2D/3D camera 100 takes at least one shot of an entire cow, or at least of the udder and, preferably, also of the hind legs of the cow. On the basis thereof it is possible for the central processing unit 122 to determine the spatial position of the udder and, possibly, of the hind legs. On the basis of the spatial positions of the teats 46 and, possibly, on the basis of the spatial image of the positions of the legs, the central processing unit 122 determines the route to be followed by the robot arm 4. The central processing unit 122 moves the robot arm 4 and in particular the teat cups 28 located thereon to the teats 46 concerned.

Depending on the embodiment of the relevant robot arm construction 3, the teat cups 28 are moved successively or simultaneously to the teats 46 concerned and attached thereto. Preferably, the central processing unit 122 bases the desired movement of the robot arm 4 on a simultaneous observation of both the teat 46 and the teat cup 28 to be attached. It is possible for the central processing unit to deduce therefrom a mutual distance, direction and speed, which further improves the accuracy of the navigation. This has also the advantage that variations of the position of the teat cup 28 are processed automatically. Such variations occur, for example, if the teat cup 28 is not always received in the same manner in its holder 43.

According to the inventive method, the central processing unit 122 controls the milking implement, after the teat cup 28 has been attached to the teats 46, on the basis of images from the 2D/3D camera 100. It is possible for the central processing unit 122 to conclude, on the basis of any mutual movement between the teat cup 28 and the teat 46 concerned, that the connection between the teat cup 28 and the teat 46 decreases and that the milking by means of the relevant teat cup 28 should (almost) be terminated. At a sudden great mutual movement of the teat cup 28 relative to the teat 46 concerned, it is possible for the central processing unit 122 to conclude that the relevant teat cup 28 has come loose from the teat 46 concerned, for example because the cow has kicked against it. In that case, it is possible for the central processing unit 122 immediately to perform a control action, for example by tightening the cord 50, in order to ensure that the relevant teat cup will not fall onto the floor of the milking parlour 1, where it could be contaminated. It is also possible for the central processing unit 122 to lower the vacuum and to take preventive measures, such as separating the possibly contaminated milk and/or cleaning the relevant teat cup 28 and the associated milk hose 29.

By further making the 2D/3D camera 100 observe a larger part of the cow than only the udder with the teats 46, it is possible, for example, also to observe the legs of the cow concerned. On the basis of the observation of the legs and/or other parts of the cow, it is possible for the central processing unit 122 to determine a risk that a leg kicks off a teat cup, or that the leg concerned would hit the robot arm construction 3. It is also possible for the central processing unit 122 to establish, on the basis of a spatial image of the cow's back, a risk that the cow will relieve herself. If the central processing unit 122 determines that a risk of kicking off and/or the cow relieving herself is greater than a predetermined value, it may decide to perform preventive control actions, such as controlling an actuator for displacing the robot arm construction 3 or for preventively tightening the cord 50.

If the camera 100 observes that the teat cup 28 is frequently at a greater distance from the udder 47 than a predetermined value (FIG. 10), it will be possible for the central processing unit 122 further to analyze this. If the teat 46 has already been attached at least during a first predetermined period of time, the result of the analysis will be that the milking of the teat 46 concerned should be terminated. An image of the size of the udder may also be included in this analysis. This image may be compared with a start image of the udder concerned, which start image has been produced prior to the milking.

As a result of such an analysis, the central processing unit 122 will detach the teat cups 28, as a control action, by removing the milking vacuum, will lead them, with the aid of the actuator 52, to the relevant holders 43 by means of their cord 50, and will move the robot arm 4 from under the cow. Subsequently, the exit door will be opened. On the basis of the images from the 2D/3D camera 100, it will be possible for the central processing unit 122 to establish when the cow has completely left the milking parlour 1, after which it will be possible for the relevant actuator to close the exit door.

Figure 10:
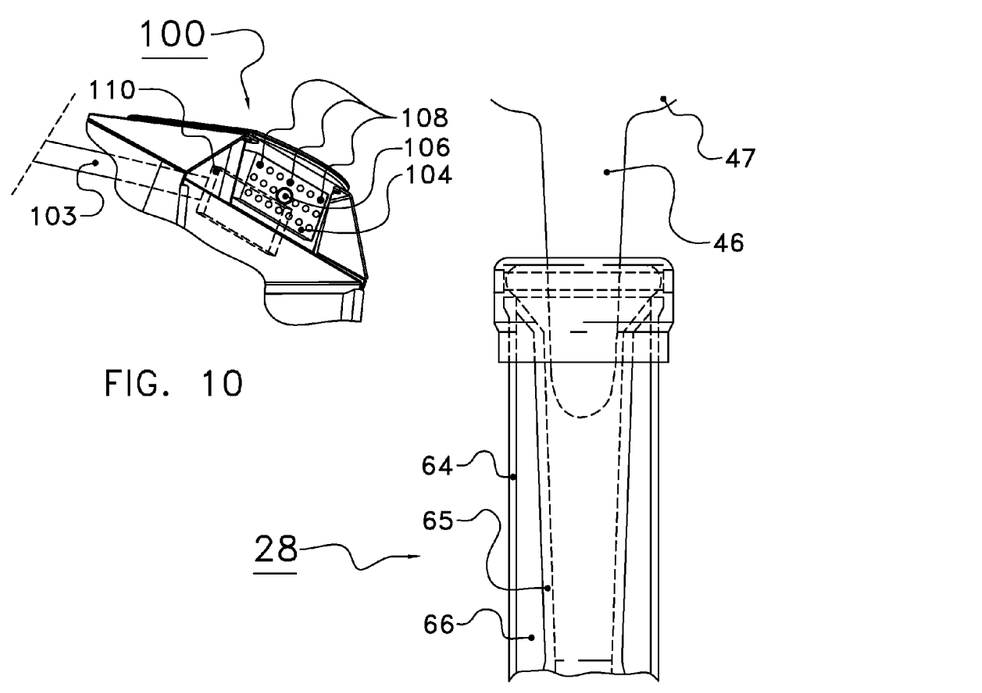
FIG. 10 is a detail of a camera with a teat cup, during the observation of a partially shifted off situation of the teat cup.

A situation as shown in FIG. 10, which occurs within the predetermined period of time and/or in which there is no sufficient reduction of the size of the udder, leads to an analysis that the milking and/or pulsation vacuum should be adjusted, or that the pulling force on the cord 50 should be reduced. Adjustment of the pulsation vacuum is possible, for example, by prolonging the release phase, i.e. by prolonging the period of time in which atmospheric pressure is exerted on the liner 65, by admitting atmospheric pressure to the pulse hose 67 for a longer period of time by means of a relevant actuator.

Figure 11:
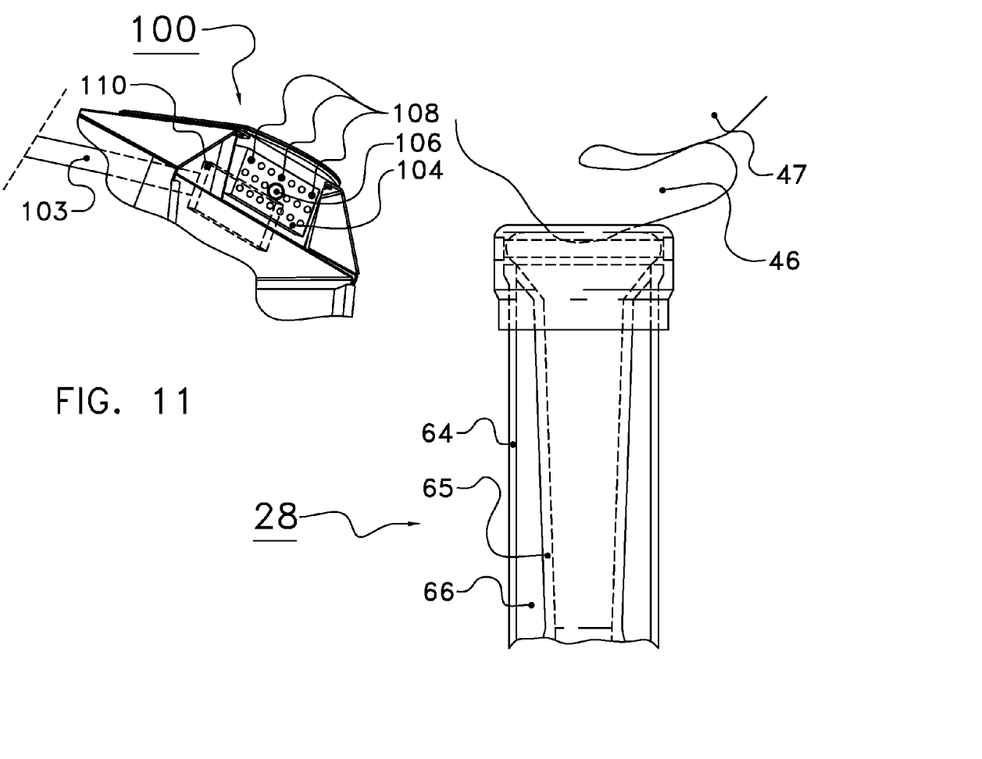
FIG. 11 is a detail of a camera with a teat cup, during the observation of a teat that has tipped over.

A distance between the teat cup 28 and the udder 47 that exceeds a predetermined value may also be an indication of an improper attachment of the teat 46, for example because said teat has tipped over as shown in FIG. 11. The analysis gives this result if such a distance is observed within a second predetermined period of time, which second predetermined period of time is shorter than the first predetermined period of time, for example 15 seconds, or at the most 60 seconds. The analysis may also give this result if not only the distance between the teat cup 28 and the udder 47 is greater than a predetermined value, but if, in the vicinity of the teat cup 28 and the udder 47, also a shape is observed that corresponds to a certain extent to one of a plurality of previously stored views of shapes of a teat 46 that has tipped over.

By means of one of the teat cups 28 as described in relation to FIGS. 6-9, it is also possible to make an analysis of the receipt of the teat 46 in the teat cup, for example by determining the position of an end of the teat 46 relative to the teat cup 28. If this position is insufficiently deep, i.e. at a smaller distance from the upper side of the teat cup 28 than a predetermined distance, the result of the analysis will be that the teat 46 concerned is not properly attached and the control action will comprise a renewed attachment.

Such an analysis of the position of the end of the teat 46 relative to the teat cup 28 can be repeated and in that case the result of such an analysis may be that the teat concerned has been sucked too deep into the teat cup 28. As a control action, it is possible to increase the pulling force on the cord 50 and/or to decrease the milking vacuum. By comparing consecutive images of the teat 46 with each other it is possible to make an analysis of the development of the position of the end of the teat 46. This development gives an indication of the stage of the milking process. If the position of the end of the teat 46 reaches a predetermined place, the milking of the teat 46 concerned as a control action can be terminated.

By means of one of the teat cups 28 as described in relation to FIGS. 6-9, it is also possible to make an analysis of the extent to which the milking process progresses by looking at the width (by means of a 2D camera), or the size (by means of a 3D-camera), which provides information regarding the swelling of the teat 46. The swelling of the teat 46 gives an indication of the remaining milk. The movement of the teat 46 in the teat cup 28 may also be involved in this analysis. By determining the movement of the teat in the teat cup 28 there is generated comparable information as described above when a varying distance between the upper side of the teat cup 28 and the udder 47 is observed. A control action when observing a relatively large swelling may be the deepening of the milking vacuum. The control actions, in the case of an analysis of the end of the milking process, relate to terminating the milking. Of course, it is also possible to involve a plurality of the factors separately described above in an analysis.

The milking implement may further be controlled by observing a milk flow squirting from the teat 46 into the teat cup 28. The camera 100 is capable of observing the size (width and/or depth-information), speed and/or duration of the milk flow. On the basis thereof it is possible to make an analysis of the momentary milk pressure in the udder 47 and of the development of the milking process. In the case of a high milk pressure, deepening the milking vacuum and/or prolonging the suction phase may be performed as control actions. In the case of a decreasing development, it is possible to perform the inverse control actions or to switch to a post-milking treatment. Of course, minimum and/or maximum values for the vacuum level and the length of the suction phase may be stored in the memory of the central processing unit 122. The suction phase is preferably limited to a maximum of 700 ms.

By means of one of the teat cups 28 as described in relation to FIGS. 6-9, it is also possible to make an analysis of the quality of the pulsation vacuum. At the generation of the pulsation vacuum, disturbances may occur or there may be leakage in the relevant lines. Both defects lead to the liner 65 not showing the change in shape that is visible by comparing FIGS. 7 and 8. In other words: from consecutive images from the camera 100 it will have to appear that the liner 65 deforms rhythmically. Such a deformation and the place where it occurs may be stimulated, if desired, by applying a liner 65 that is locally weakened, so that at this weakened place there will be formed a fold if the pulsation pressure is greater than the milking vacuum. Such a monitoring of the pulsation vacuum by means of the camera 100 has the additional advantage that no pressure sensor has to be used. Pressure sensors have a relatively limited life, so that they should be replaced frequently.

By means of the camera 100 it is further possible to monitor whether components of the milking implement get defective. It is thus possible, for example, to establish whether a breaking of the cord 50 occurs. In the case of a defect, the central processing unit 122 will transmit a signal to the PC 126 and, if necessary, correcting control actions will be performed immediately. In most of the cases these will be control actions that are aimed at terminating the milking process. In the case of a breakage of the cord 50, it is also possible to choose to maintain the attachment of the teat cup 28—whether or not at an adjusted vacuum level—until it is possible to detach it manually or in another manner without the teat cup falling onto the floor.

Figure 12:
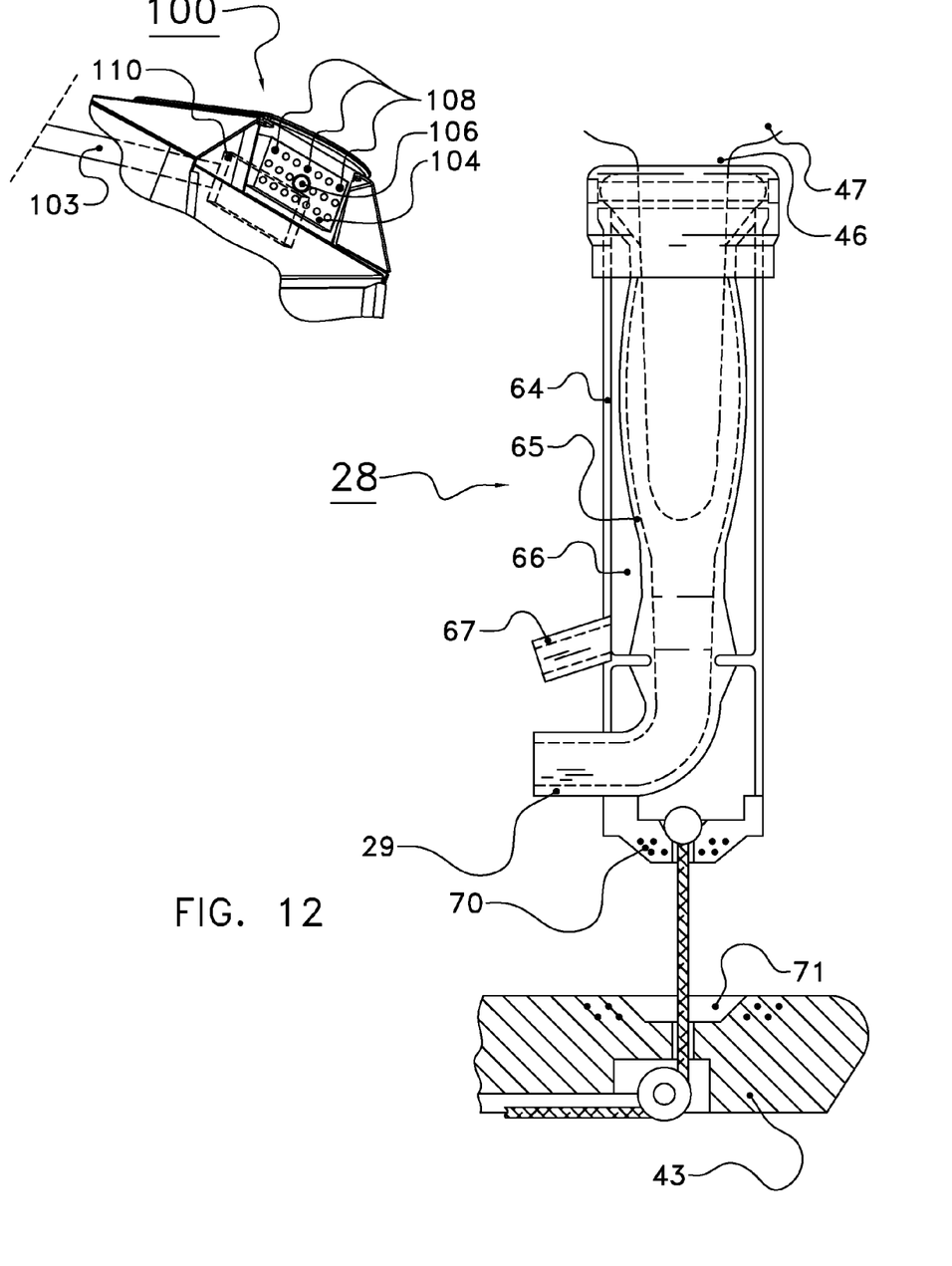
FIG. 12 is the embodiment of FIG. 6, with a bulging out liner.

After some time, wear of the liner 65 may occur. This may lead to balloon formation during the suction phase. This means that the liner 65 shows a bulging at the height of the teat 46, as shown in FIG. 12. Such a balloon formation is undesired, because it causes an unintended load of the teat 46 and because the teat cup 28 will thus sooner fall from the teat 46. Balloon formation of the liner 65 can be observed by the camera 100, because the shape in a two-dimensional view, or the size in a spatial image, exceeds a predetermined value. As a temporary control action, the level of the milking vacuum and/or the pulsation vacuum may be adjusted. There is further given a signal via the central processing unit 122 to the PC 126 that the relevant liner should be replaced.

It is common practice that during milking there is a balance between an upward force on the teat cup 28, exerted thanks to the milking vacuum on the teat 46, and a downward force due to the weight of the teat cup 28. In an advantageous variant of the shown teat cup 28, a teat cup 28 is designed as an extra light one, for example 100 grams lighter than a commonly used teat cup. Subsequently, on the basis of an observation by the camera 100 of the teat prior to and/or during milking, it is determined to what extent an additional vertical force is needed. Subsequently, said vertical force is exerted by means of the actuator 52 and the cord 50. If desired, the relevant vertical force may be adjusted during milking, as already described in the foregoing.

As a possible component of the inventive method, the position of one or a plurality of teat cups 28 relative to the udder 47 may be optimised. On the basis of a start image of the udder 47 with one or a plurality of teats 46, it is possible to determine the orientations of the teats 46 concerned relative to the udder 47. By comparing the orientations in an analysis with the known, or observed, mutual distances of the plurality of teat cups 28 to be attached, it is possible to determine such a position for the robot arm 4 that the various teat cups 46, after having been attached, cause together a smallest possible displacement of the teats 46 concerned. During milking, the current orientation of the teat cups 28 relative to the udder 47 may be determined by means of the camera 100. This observed orientation may be compared in an analysis with the known orientation in the inoperative position of the teats 46 concerned. On the basis thereof, control actions may be performed, for example by displacing the robot arm 4, in order to bring the orientation of the teat cups 28 more into line with the inoperative position of the teats 46.

Within the scope of the invention various variants are possible. For example, it is also possible to apply for the camera, instead of infrared light, light with other wave lengths, among which visible light and ultraviolet light. Instead of amplitude modulation, frequency modulation may also be applied. It is also possible to provide the light sources at another position than on the housing of the lens and the image sensor, for example by means of a separate housing on the robot arm. In that case it is indeed of importance, of course, that the distance between the light sources and the image sensor is known, so that the calculated distance from the teat observed can be corrected accordingly. For various steps of the described method it is also possible to work with a camera that only generates two-dimensional images.

The camera may be connected movably, instead of rigidly, to the robot arm, or be connected, separately from the robot arm, rigidly or movably at a position near the milking parlour, for example to the fencing.

The control system does not have to be set up around a central processing unit. There may also be provided decentralized processing units, whether or not integrated with existing components, such as the CMOS image sensor. By also designing the actuators with decentralized processing units, there may even be obtained a network control, wherein the various decentralized processing units are in direct communication with each other.

It is advantageous to have a great number of tasks of the implement for automatically milking a cow performed on the basis of the spatial images from one 2D/3D camera, as described above. There is thus saved on purchase and maintenance of various separate sensors. However, the invention is already advantageous if only one task, or a combination of a smaller number of tasks, is performed on the basis of the images from the 2D/3D camera. In such cases the 2D/3D camera does not have to observe specifically a teat, but other parts of a cow, or even an entire cow.

Furthermore, an implement for automatically milking according to the invention may also be used advantageously for other dairy animals, such as goats. Other types of milking implements may also be used, such as implements with a totally different type of milking robot, implements in which a robot arm is moved to and from the cow with the aid of differently orientated axes of rotation, or implements in which the cow has a greater extent of freedom of movement.

Thus, the invention has been described by reference to certain embodiments discussed above. It will be recognized that these embodiments are susceptible to various modifications and alternative forms well known to those of skill in the art. Accordingly, although specific embodiments have been described, these are examples only and are not limiting upon the scope of the invention. The person skilled in the art will be able to apply various modifications and adaptations within the scope of the invention, the scope of protection for the invention being determined by the accompanying claims.

What is claimed is:

1. A method of controlling a milking implement for automatically milking a dairy animal with an udder, the milking implement comprising a camera and a teat cup, and the method comprising:
    attaching the teat cup to a teat of the udder, followed by;
    producing by means of the camera an image of at least a part of the udder and of at least a part of the teat cup;
    making an analysis of the image of the udder with the teat cup; and
    performing at least one control action by means of the milking implement, based on the analysis; wherein the step of making the analysis comprises analyzing a manner in which the teat is received in the teat cup, wherein a distance from an upper edge of the teat cup to the udder is determined, which distance is compared with a predetermined value.

2. The method according to claim 1, wherein an analysis is made of a position of an end of the teat relative to the teat cup.

3. The method according to claim 1, wherein an analysis is made of a duration and/or a size of a milk flow from the teat.

4. The method according to claim 1, wherein an analysis is made of an alteration of a shape of a liner of the teat cup.

5. The method according to claim 1, further comprising a step of producing by means of the camera a start image of at least the teat, which step precedes the step of attaching the teat cup to the teat.

6. The method according to claim 5, wherein an analysis is made of a milk pressure in the teat on the basis of a comparison of the start image of the teat with a recorded image of the teat.

7. The method according to claim 5, wherein an analysis is made of an orientation of the teat relative to the udder shown in the start image.

8. The method according to claim 1, wherein an analysis is made of an orientation of the teat cup relative to the udder shown in the image of the udder with the teat cup.

9. The method according to claim 1, wherein the at least one control action comprises detachment of the teat cup.

10. The method according to claim 9, wherein the detachment of the teat cup is followed by the renewed attachment of the teat cup to the same teat of the udder.

11. The method according to claim 1, wherein the at least one control action comprises the adjustment of a vacuum in the teat cup.

12. The method according to claim 11, wherein the adjustment of the vacuum in the teat cup comprises adjustment of a magnitude of a milking vacuum that is exerted on an end of the teat in order to suck milk.

13. The method according to claim 11, wherein the adjustment of the vacuum in the teat cup comprises adjustment of a pulsation vacuum that is exerted on a liner in the teat cup.

14. The method according to claim 1, wherein the at least one control action comprises an adjustment of a pulling force on the teat cup.

15. The method according to claim 1, wherein the at least one control action comprises the displacement of a milking robot arm.

16. A control system for a milking implement for automatically milking a dairy animal, comprising software program instructions for performing the method according to claim 1.

17. A milking implement for automatically milking a dairy animal, comprising a camera, a teat cup, and a control system for performing the method according to claim 1.

18. The milking implement according to claim 17, wherein the camera is designed to produce a spatial image.

19. The milking implement according to claim 18, wherein the camera comprises:
    a radiation source for emitting electromagnetic radiation, in particular light,
    a matrix with a plurality of rows and a plurality of columns of receivers for receiving electromagnetic radiation reflected from the dairy animal, and
    sensor control unit, wherein
    the sensor control unit is operatively connected to the radiation source in order to modulate the electromagnetic radiation, and
    the sensor control unit is designed to determine for each of the receivers a phase difference between the emitted and the reflected electromagnetic radiation.

20. The milking implement according to claim 17, wherein the teat cup comprises a casing and a liner, which casing is at least partially manufactured from a material that is transmissive of light with a wave length that is observable by the camera.

21. The milking implement according to claim 17, wherein the teat cup comprises a casing and a liner, which liner is at least partially manufactured from a material that is transmissive of light with a wave length that is observable by the camera.

22. A method of controlling a milking implement for automatically milking a dairy animal with an udder, the milking implement comprising a camera and a teat cup, and the method comprising:

attaching the teat cup to a teat of the udder, followed by;

producing by means of the camera repeated images of at least a part of the udder and of at least a part of the teat cup by means of the camera;

making an analysis of differences between the repeatedly produced images of the udder with the teat cup, wherein a distance from an upper edge of the teat cup to the udder is determined, which distance is compared with a predetermined value; and performing at least one control action by means of the milking implement, based on the analysis.

* * * * *